(12) United States Patent
Mandyam et al.

(10) Patent No.: US 9,516,575 B2
(45) Date of Patent: Dec. 6, 2016

(54) MOBILE DEVICE BASED PROXY FOR BROWSER-ORIGINATED PROCEDURES

(71) Applicant: QUALCOMM Incorporated, San Diego, CA (US)

(72) Inventors: Giridhar Mandyam, San Diego, CA (US); Arungundram Chandrasekaran Mahendran, San Diego, CA (US); Nikolai Leung, Takoma Park, MD (US); Thomas Towle, Naperville, IL (US)

(73) Assignee: QUALCOMM INCORPORATED, San Diego, CA (US)

( * ) Notice: Subject to any disclaimer, the term of this patent is extended or adjusted under 35 U.S.C. 154(b) by 28 days.

(21) Appl. No.: 14/303,324

(22) Filed: Jun. 12, 2014

(65) Prior Publication Data

US 2015/0078263 A1     Mar. 19, 2015

Related U.S. Application Data

(60) Provisional application No. 61/877,914, filed on Sep. 13, 2013.

(51) Int. Cl.
*H04W 4/00* (2009.01)
*H04W 40/28* (2009.01)
(Continued)

(52) U.S. Cl.
CPC .......... *H04W 40/28* (2013.01); *H04L 61/2575* (2013.01); *H04L 61/2589* (2013.01);
(Continued)

(58) Field of Classification Search
None
See application file for complete search history.

(56) References Cited

U.S. PATENT DOCUMENTS 6,373,817 B1 * 4/2002 Kung .................. H04L 12/5692
370/215
6,650,629 B1 * 11/2003 Takahashi ............. H04W 84/20
370/335
(Continued)

FOREIGN PATENT DOCUMENTS

WO    WO-2013108121 A2    7/2013

OTHER PUBLICATIONS

Jennings C., et al., "Real-Time Communications for the Web," IEEE Communications Magazine, Apr. 2013, pp. 20-26.
(Continued)

*Primary Examiner* — Willie J Daniel, Jr.
(74) *Attorney, Agent, or Firm* — Haynes and Boone LLP

(57) ABSTRACT

An example method of facilitating communication between a mobile device positioned within an internal network and a target peer includes intercepting, at a proxy executing on a mobile device, a communication to initiate a real-time communication connection with a target peer. The mobile device is coupled to a cellular network, and the internal network is separated from one or more external networks by network address translation (NAT). The example method also includes determining whether the target peer is reachable via the cellular network. The example method further includes when it is determined that the target peer is reachable via the cellular network, sending over the cellular network to the target peer a request to communicate in a first protocol.

23 Claims, 5 Drawing Sheets

(51) Int. Cl.
*H04W 40/06* (2009.01)
*H04L 29/12* (2006.01)
*H04L 29/06* (2006.01)
*H04L 29/08* (2006.01)

(52) U.S. Cl.
CPC ........ *H04L 65/1069* (2013.01); *H04L 65/608* (2013.01); *H04L 67/02* (2013.01); *H04W 40/06* (2013.01); *H04L 61/2514* (2013.01)

(56) References Cited

U.S. PATENT DOCUMENTS

| | | | |
|---|---|---|---|
| 7,602,748 B2 | 10/2009 | Sinnreich et al. | |
| 7,706,401 B2 | 4/2010 | Bae et al. | |
| 2002/0035605 A1* | 3/2002 | McDowell | H04L 12/581 709/206 |
| 2004/0243703 A1 | 12/2004 | Demmer et al. | |
| 2005/0114533 A1* | 5/2005 | Hullfish | H04L 12/581 709/230 |
| 2012/0023190 A1 | 1/2012 | Backholm et al. | |
| 2014/0344913 A1* | 11/2014 | Stahl | H04L 12/1403 726/11 |

OTHER PUBLICATIONS

Smart SIP and Media Gateway to connect WebRTC endpoints, Doubango Telecom, Retrieved on Feb. 18, 2014, Retrieved from the Internet < URL : http://webrtc2sip.org/ >, 3 pages.
International Search Report and Written Opinion—PCT/US2014/055162—ISA/EPO—Nov. 13, 2014.

* cited by examiner

MOBILE DEVICE BASED PROXY FOR BROWSER-ORIGINATED PROCEDURES

CROSS REFERENCE TO RELATED APPLICATIONS

This application claims the benefit of priority from U.S. Provisional Patent Application No. 61/877,914, filed Sep. 13, 2013, which is incorporated by reference.

FIELD OF DISCLOSURE

The present disclosure generally relates to network communications, and more particularly to network communications at a mobile device.

BACKGROUND

WebRTC (Web Real-Time Communications) is an open project that aims to add real-time communications capabilities to Web browsers via a JavaScript Application Programming Interface (API). WebRTC offers web application developers the ability to write rich, real-time multimedia applications on the Web, without requiring plugins, downloads, or installs. For example, WebRTC may enable peer-to-peer real-time communication between browser-based applications regardless of the relative location of the target peers (e.g., on the same device, in the same private network, both behind distinct firewalls, etc.).

WebRTC adopts a technique called Interactive Communication Establishment (ICE), which allows for target peers in an Internet Protocol (IP)-based communications session to discover the best possible media path between them. This may be useful in the sense that an ICE implementation is a turnkey solution for Network Address Translation (NAT) traversal that requires no prior knowledge of the type of NATs or firewalls that may lie between the two target peers.

ICE leverages the Session Traversal Utilities for NAT (STUN) and Traversal Using Relays Around NAT (TURN) protocols. STUN is an IP-based protocol by which a target peer can discover whether it is behind a NAT traversal box. By contacting a known server in the open Internet and receiving a response back, the target peer can compare its own IP address with the IP address that the STUN server detected as the originating IP address for the STUN message. In this manner, the target peer can quickly determine if it is behind a NAT.

In an example, a STUN request message is sent by one of the target peers (also known as a peer) to a known STUN server on the public Internet. The STUN server's IP address may be known a priori by the peer or is discoverable (e.g., with the help of a Domain Name System (DNS) service). When the STUN server receives the STUN request from the peer, the STUN server sends back a STUN response message that includes the originating IP address. If a NAT was present between the peer and the STUN server (e.g., the peer is on a private network), the IP address in the STUN response message will not match the peer's IP address on its private network. This kind of messaging only partly solves the problem of NAT traversal. A NAT may be server-reflexive in that a one-to-one mapping exists between the peer's private IP address and the IP address provided by the NAT on behalf of the peer to all destinations in the public Internet. Many NATs, however, are symmetric—there is a unique IP address mapping for the peer for each of its destination IP addresses on the public Internet. Therefore, a mechanism that moved beyond simple IP address discovery was needed. As a result, the TURN protocol was developed.

TURN solves the problem of a NAT'ed peer receiving traffic from any other target peer on the Internet by setting up a TURN server on the public Internet that relays traffic to and from the NAT'ed peer. For example, the originating peer initially sends a "TURN Allocate" request usually without necessary fields to ensure message integrity. In response the TURN server sends an "Allocate Error" message with necessary values for future messaging (e.g., nonce for hashing), after which the originating peer can resend the "TURN Allocate" message with the necessary message integrity and receive a "TURN Allocate" response, where the NAT'ed peer can not only determine its presence behind a NAT but also be allocated a relayed IP address from the TURN server that can be used to set up communication with other peers.

ICE provides a framework around the use of STUN and TURN so that two peers can negotiate the best possible media path between them in the presence of NATs. Based on each peer's detection of IP addresses and ports that can be used to contact them, "candidate pairs" of IP addresses/ports are tested and ranked in terms of ICE client-specified priority. The ICE standard provides an example algorithm for prioritization. As a result, ICE defines an offer/answer mechanism for negotiating the parameters of the communication session between peers based on a protocol (e.g., Session Description Protocol (SDP)).

BRIEF SUMMARY

This disclosure relates to network communications. Methods, systems, and techniques for facilitating communication for a mobile device are provided.

According to an embodiment, a method of facilitating communication between a mobile device positioned within an internal network and a target peer includes intercepting, at a proxy executing on a mobile device, a communication to initiate a real-time communication connection with a target peer. The mobile device is coupled to a cellular network, and the internal network is separated from one or more external networks by network address translation (NAT). The method also includes determining whether the target peer is reachable via the cellular network. The method further includes when it is determined that the target peer is reachable via the cellular network, sending over the cellular network to the target peer a request to communicate in a first protocol.

According to another embodiment, a system for facilitating communication between a mobile device positioned within an internal network and a target peer includes an intercept module executable on a mobile device. The internal network is separated from one or more external networks by network address translation (NAT), and the mobile device is coupled to a cellular network. The intercept module intercepts a communication to initiate a real-time communication connection with a target peer. The system also includes a communication module executable on the mobile device. The communication module determines whether the target peer is reachable via the cellular network, and when it is determined that the target peer is reachable via the cellular the communication module network sends over the cellular network to the target peer a request to communicate in a first protocol.

According to another embodiment, a computer-readable medium has stored thereon computer-executable instructions for performing operations including intercepting, at a proxy executing on a mobile device, a communication to initiate a real-time communication connection with a target peer, the mobile device being coupled to a cellular network; determining whether the target peer is reachable via the cellular network; and when it is determined that the target peer is reachable via the cellular network, sending over the cellular network to the target peer a request to communicate in a first protocol.

According to another embodiment, an apparatus for facilitating communication between a mobile device positioned within an internal network and a target peer includes means for intercepting a communication from an originating peer at a mobile device to initiate a real-time communication connection with a target peer. The mobile device is coupled to a cellular network, and the internal network is separated from one or more external networks by network address translation (NAT). The apparatus also includes means for determining whether the target peer is reachable via the cellular network. The apparatus further includes means for when it is determined that the target peer is reachable via the cellular network, sending over the cellular network to the target peer a request to communicate in a first protocol.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
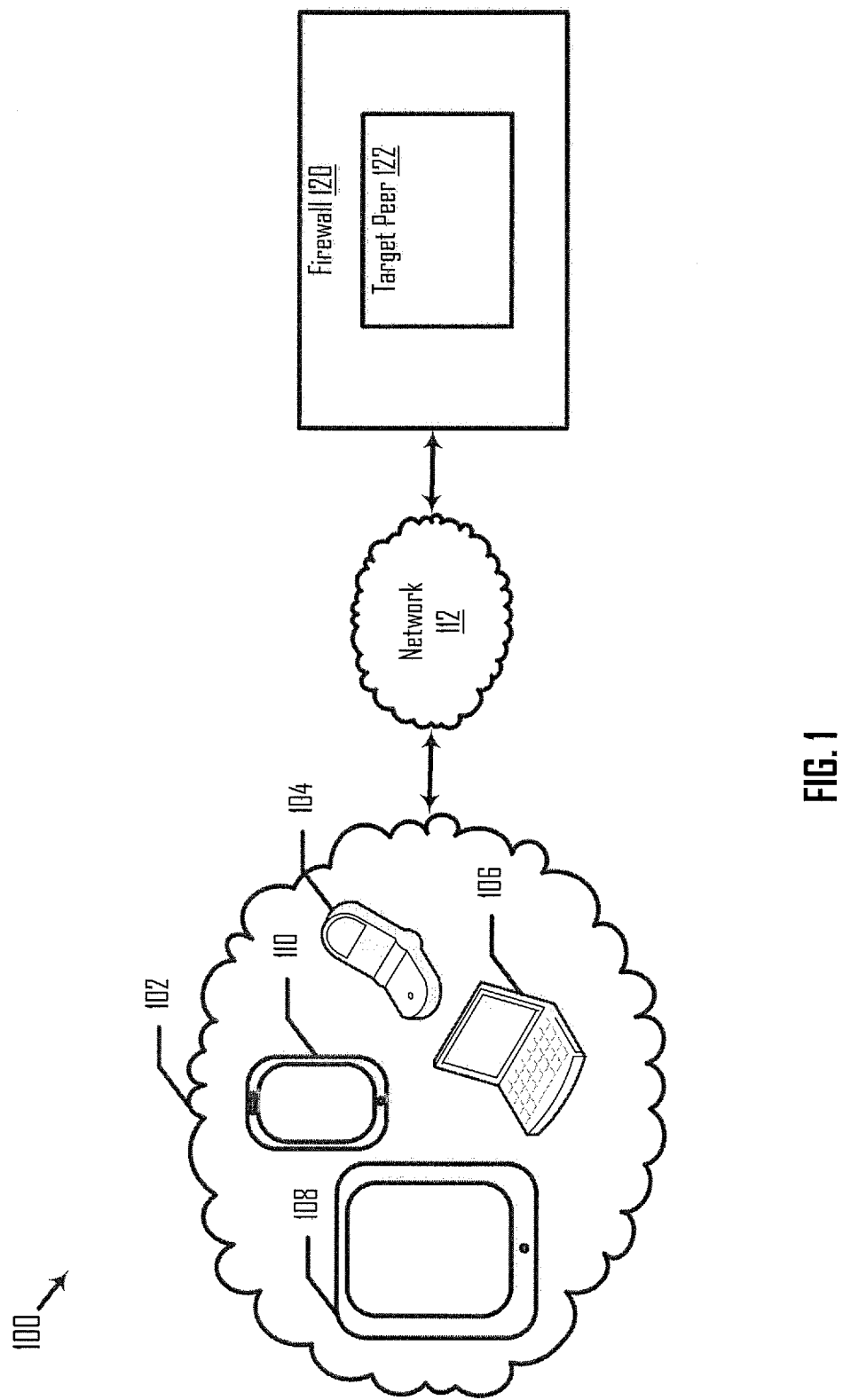
FIG. 1 is a block diagram illustrating a system including a target peer and mobile devices positioned within an internal network, according to an embodiment.

I. Overview
II. Example System Architectures
III. Example Method
IV. Example Wireless Device I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The WebRTC technology currently being standardized enables web developers to establish real-time communications in a peer-to-peer sense between browsers. WebRTC is an application that provides two-way real-time communications capability between two peers. The current WebRTC specification has a dependency on the ICE standard for traversal of NATs. Given a deployment scenario on a cellular network, an ICE session in the context of WebRTC may result in inefficiencies that may affect mobile device battery life and result in unnecessary over-the-air transactions.

In particular, ICE can potentially be problematic, particularly when operating in a cellular context and more specifically when interoperating with an IP Multimedia Subsystem (IMS) enabled core network. For example, a potential issue is that the SDP-based offer/answer mechanism can result in a significant number of over-the-air messaging transactions that have their own associated costs in terms of cellular network capacity (both over the air and within the radio access network (RAN)). Another potential issue is that many existing Voice over IP (VoIP) target peers (including IMS) do not support ICE. Another potential issue is that ICE allows for keep-alive mechanisms based on the STUN binding procedure. Application-based keep-alive mechanisms are well-known to have not only network efficiency costs but also can potentially limit the battery life of a mobile device. Another potential issue is that with respect to WebRTC if the user for any reason shuts down the application (e.g., the browser), then the ICE context may be potentially lost and the offer/answer exchange may have to begin afresh. Another potential issue is that ICE offers no efficiencies when both peers are not behind firewalls, which is common for handset-to-hand set communications. Further, ICE may still implement a media check even if there is essentially only a single candidate pair. This is a list of non-limiting potential issues.

The present disclosure provides techniques for using a proxy executable on a mobile device and associated functionality that intermediates browser-originated ICE procedures and leverage services offered by an operator-deployed network (e.g., presence) to ensure efficient communication between WebRTC peers.

For brevity, the disclosure may describe WebRTC as being the technology that enables real-time communication between applications and ICE as being the technology that connects remote peers using NAT traversal technologies (e.g., STUN and TURN), but this is not intended to be limiting and it should be understood that other technologies that provide these capabilities are within the scope of this disclosure.

II. Example System Architectures

FIG. 1 is a block diagram illustrating a system 100 including a target peer and mobile devices positioned within an internal network 102, according to an embodiment.

Internal network 102 may be, for example, a cellular network. Internal network 102 is separated from one or more external networks by network address translation (NAT). Mobile devices 104, 106, 108, and 110 are coupled to internal network 102 and may communicate with each and/or a target peer located in an external network. Examples of mobile devices are a smartphone, personal digital assistant (PDA), tablet, and laptop. Other mobile devices are within the scope of the present disclosure.

System 100 includes a firewall 120 that can be implemented in hardware, software, or a combination of both. A target peer 122 is illustrated as being behind firewall 120. A firewall is frequently used to prevent unauthorized Internet users from accessing private networks, such as intranets, that are connected to, for example, network 112.

Network 112 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. Network 112 may support SIP. In an example, network 112 includes a Long Term Evolution (LTE) network. An LTE network is a wireless broadband technology and has its architecture based on IP.

Firewall 120 is configured to permit or deny network transmissions (e.g., to target peer 122) based upon a set of rules and other criteria. All messages entering or leaving the intranet pass through firewall 120, which inspects each message and blocks those that do not meet the specified security criteria. Firewall 120 may have functionality to protect hosts behind the network by implementing NAT functionality. The firewall provides private addresses as defined in RFC 1918 to the hosts protected behind a firewall.

Figure 2:
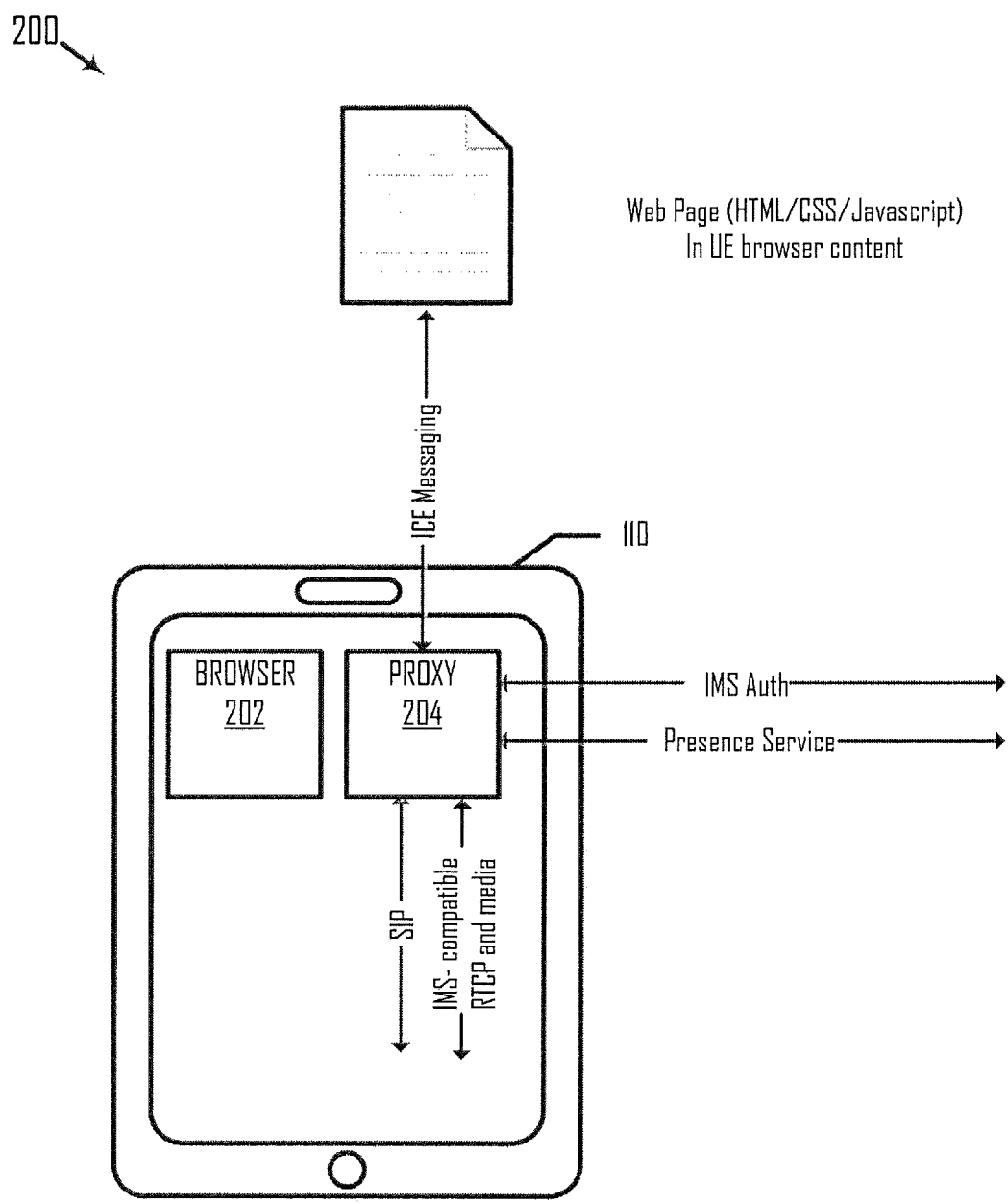
FIG. 2 is a block diagram illustrating a system for facilitating communication between a mobile device positioned within an internal network and a target peer, according to an embodiment.

FIG. 2 is a block diagram illustrating a system 200 for facilitating communication between a mobile device positioned within an internal network and a target peer, according to an embodiment. The internal network may be separated from one or more external networks by NAT.

System 200 includes mobile device 110 capable of executing a client application, such as a browser 202, and a proxy 204. Browser 202 may be capable of accessing and displaying webpages on a display of mobile device 110. Browser 202 may also be capable of voice and video coding and establishing communications in real time with a target application executing on a mobile device. In an example, browser 202 and the target application are each browsers executing on a mobile device, and the browsers communicate with each other in real-time. In such an example, the user of mobile device 110 may point the browser to a webpage that enables the user to click on an option provided by the webpage to place a call. A user may point the browser to a webpage by, for example, typing a uniform resource location (URL) of the webpage in the address bar of the browser or selecting a hyperlink that causes a server to provide the webpage. The browser may place the call without using a phone line. Rather, the browser may establish a connection over network 112 with a target peer to place the call. In an example, network 112 is the Internet, and browser 202 sets up an IP connection via the Internet to place the call.

In an embodiment, browser 202 uses WRTC technology to place the call. As discussed above, WRTC uses ICE, which may have disadvantages. For example, ICE is a "heavy" protocol and entails the use of multiple back and forth messaging to establish a connection. Proxy 204 may be used to facilitate the communication between mobile device 110 and the target peer such as to optimize the communication to better suit a cellular connection. For example, proxy 204 in the WebRTC context may be used to intermediate ICE messaging originating from browser 202, while at the same time establishing connectivity to other target peers that proxy 204 has already detected as being within the operator firewall. Proxy 204 is capable of determining whether mobile device 110 on which proxy 204 is executing is separated from one or more external networks by NAT. In an example, proxy 204 does not use ICE to determine whether mobile device 110 is separated from one or more external networks by NAT. Rather, proxy 204 may be preconfigured to know that mobile device 110 is separated from one or more external networks by NAT. As such, it may be unnecessary for ICE messages to be sent back and forth between mobile device 110 and the target peer.

Figure 3:
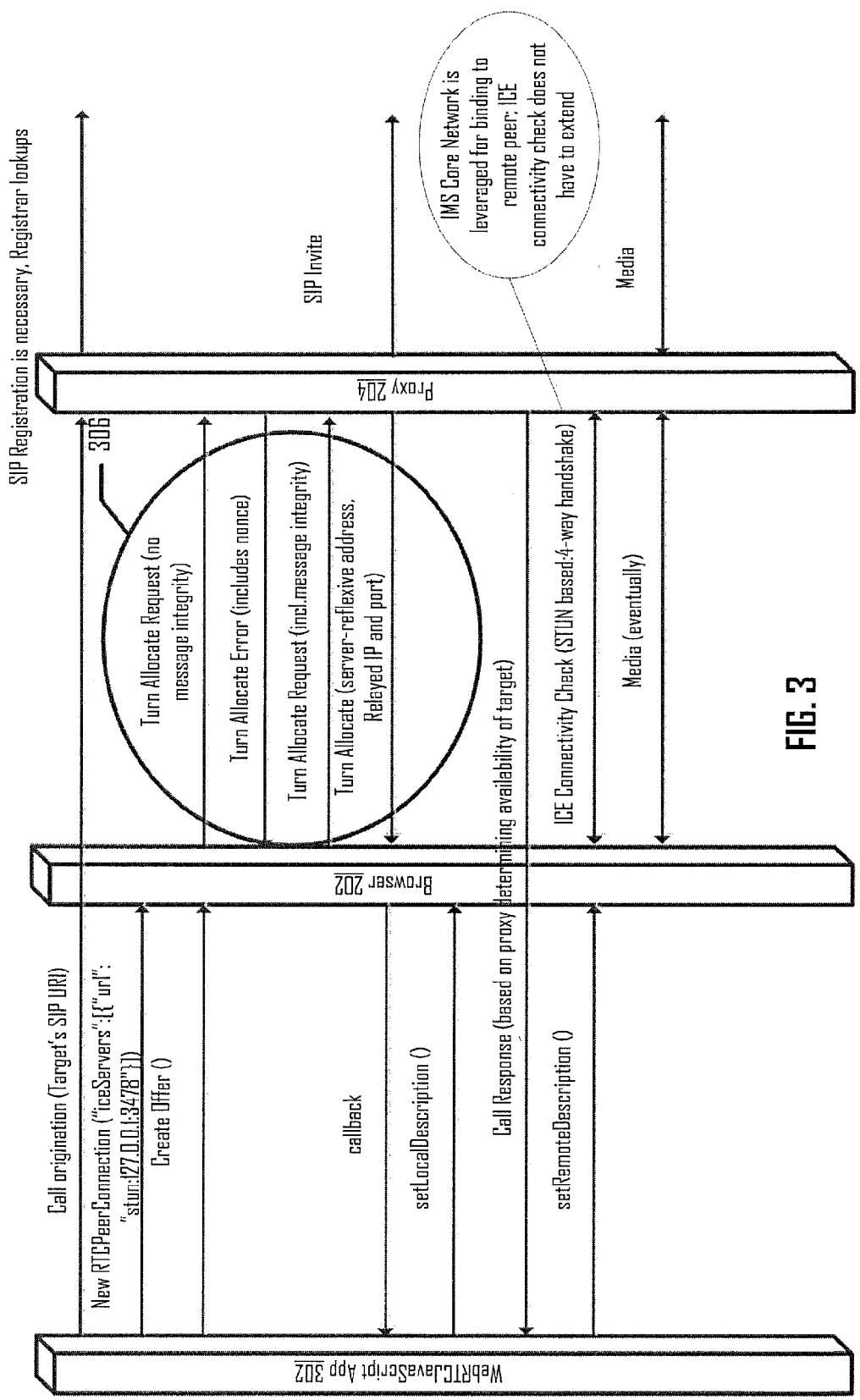
FIG. 3 illustrates a partial call setup signaling diagram, according to an embodiment.

FIG. 3 illustrates a partial call setup signaling diagram 300, according to an embodiment. Diagram 300 illustrates an ICE-based call origination with proxy 204 and assumes that the target peer is not behind a firewall.

In an example, browser 202 is executing on mobile device 110, and a user points the browser to a website that hosts a WebRTCJavaScriptApp 302. WebRTCJavaScriptApp 302 may be a JavaScript application that is configured to detect whether proxy 204 is executing on mobile device 110 and to communicate with proxy 204. In FIG. 3, a call "Call origination (Target's SIP URI)" is generated from WebRTCJavaScriptApp 302 to proxy 204 and may use the minimum amount of connectivity provided by the browser. For example, the browser may provide a pipe with base connectivity to enable WebRTCJavaScriptApp 302 to place the origination call using, for example, WebSocket or XMLHttpRequest to proxy 204. Browser 202 may allow WebRTCJavaScriptApp 302 to send packets to and receive packets from proxy 204 and inform WebRTCJavaScriptApp 302 whether the packets were successfully received by proxy 204.

In an example, a website provider is provided with WebRTCJavaScriptApp 302 from a third party (e.g., a provider of proxy 204) to enable the functionality of proxy 204 to be realized. If the user of mobile device 110 wants to place a call, the user may point browser 202 to the website or be redirected to the website that hosts WebRTCJavaScriptApp 302. In another example, WebRTCJavaScriptApp 302 is preinstalled on mobile device 110.

WebRTCJavaScriptApp 302 may send the call "Call origination (Target's SIP URI)" to detect whether proxy 204 is installed on mobile device 110. In an example, proxy 204 is assigned a pre-specified IP address. The pre-specified IP address may be an IP address that is reserved for local use on a device (e.g., mobile device 110). In an example, the IP address is 127.0.0.1. Proxy 204 may receive a communication requesting whether the proxy resides on mobile device 110 and may send a communication indicating that the proxy resides on mobile device 110.

In an example, when WebRTCJavaScriptApp 302 detects that proxy 204 is installed on mobile device 110, WebRTCJavaScriptApp 302 directly contacts proxy 204 to request its services. WebRTCJavaScriptApp 302 may instruct browser 202 to establish a connection to proxy 204 and to communicate with proxy 204. In an example, WebRTCJavaScriptApp 302 does not inform browser 202 that proxy 204 is executing on the same device as browser 202. In response to calls received from browser 202, proxy 204 may imitate a valid endpoint as far as browser 202 is concerned as discussed below.

Whether or not proxy 204 is installed on mobile device 110, WebRTCJavaScriptApp 302 may send a call "New RTCPeerConnection ("iceServers":[{"url":"stun:127.0.0.1:3478"}])" to browser 202 to initialize an RTCPeerConnection object. Once the RTCPeerConnection object has been initialized, WebRTCJavaScriptApp 302 may send another call "createOffer( )" to browser 202. Browser 202 may then use ICE to negotiate the best possible media path between mobile device 110 and the target peer in the presence of NATs.

As illustrated in a circle 306, browser 202 sends a call "TurnAllocateRequest(no message integrity)" to proxy 204, and proxy 204 receives the call "TurnAllocateRequest(no message integrity)." Proxy 204 sends a response "TurnAllocateError(includes nonce)" to browser 202, and browser 202 receives the response "TurnAllocateError(includes nonce)." Browser sends another call "TurnAllocateRequest (incl.message integrity)" to proxy 204, and proxy 204 receives call "TurnAllocateRequest(incl.message integrity). Proxy 204 sends a response "TurnAllocate(sever-reflexive address, Relayed IP and port)", and browser 202 receives the response "TurnAllocate(sever-reflexive address, Relayed IP and port)".

When browser 202 performs the ICE messaging calls in circle 306, browser 202 expects valid return signaling responses from proxy 204. The calls in circle 306 illustrate wasteful TURN messaging that can be masked by proxy 204. In an embodiment, proxy 204 receives the TURN messages, but does not send them over the air. Proxy 204 may send the minimum amount of information over the air to set up the call. In an embodiment, proxy 204 receives calls in the TURN protocol from browser 202 to send to the target peer and discards one or more of these calls. Rather, proxy 204 may determine to send the target peer a SIP invite to initiate real-time communication with the target peer.

In an example, proxy 204 sends a request to have the WebRTC session point to proxy 204 so that it may eliminate the wasteful signaling by, for example, sending a SIP invite to the target peer and communicating with the target peer using SIP. The user may invoke an API in browser 202 to set up the WebRTC connection (e.g., peer connection in standards) and have the WebRTC session point to, for example, IP address 127.0.0.1 so that the ICE messaging goes through proxy 204. This may be advantageous because proxy 204 provides optimizations that browser 202 may be unable to provide. For example, browser 202 may be unable to determine how mobile device 110 is coupled to the network (e.g., via a cellular connection or WiFI) and also may be unable to determine whether mobile device 110 is behind a NAT. Thus, rather than use ICE so that two peers can negotiate the best possible media path between them, proxy 204 may send from the originating peer a SIP invitation to the target peer.

Proxy 204 may intercept a communication from browser 202 to the target peer to initiate a real-time communication connection. Proxy 204 may listen on mobile device 110 for these types of communications. Proxy 204 may determine whether the target peer is reachable via cellular network 102. In an example, the target peer is a subscriber to cellular network 102, and proxy 204 may be able to determine whether the target peer is reachable via cellular network 102 because proxy 204 is on the cellular network and an operator of the cellular network has a presence service that proxy 204 uses. When it is determined that the target peer is reachable via the cellular network, proxy 204 may send over the cellular network to the target peer a request to communicate using a protocol different from ICE. In an example, the protocol is SIP, although other signaling communications protocols may be used.

When WebRTCJavaScriptApp 302 detects that proxy 204 is installed on mobile device 110, WebRTCJavaScriptApp 302 may want to set up a call using WebRTC with the target peer. In an example, WebRTCJavaScriptApp 302 has the target peer's number and sends the number through the web socket using the "Call origination" call. Proxy 204 may detect whether the target peer is on network 112. If target peer is on network 112, proxy 204 may route messages directly to the target peer. As discussed, proxy 204 may communicate with the target peer using SIP rather than sending the target peer the TURN messages illustrated in circle 306.

In an embodiment, proxy 204 registers with a SIP registry. An operator SIP registrar can be leveraged to provide an early call acceptance/rejection, and can be used to trigger network-initiated paging of the target peer if it is currently unregistered. The call origination can leverage operator-provided peer credentials (e.g. SIP uniform resource identifier (URI)). As discussed, proxy 204 may mimic a TURN server and as a result prevent unnecessary TURN signaling or ICE connectivity checks from going over the air. In this way, proxy 204 may avoid sending unnecessary data over the air, thus optimizing the battery life of the battery powering mobile device 110.

Further, periodic ICE connectivity checks can also be used as a keep-alive mechanism. Application-enabled (in this case browser-enabled) keep-alive mechanisms on mobile devices have known issues based on their implementation. Proxy 204 may modulate and even block ICE-based keep-alive data. In an example, proxy 204 determines a rate of keep-alive messages being sent to the target peer and modulates the rate of keep-alive messages being sent to the target peer. Modulating the rate may include intercepting one or more keep-alive message and discarding one or more of the intercepted keep-alive messages.

The target peer may respond to proxy 204 by accepting or rejecting the SIP invitation. The target peer may or may not be running a proxy similar to proxy 204. If the target peer is not running a proxy similar to proxy 204, messages may be routed to the application running on the target peer and proxy 204 may communicate with the application running on the target peer. If the target peer is running a proxy, proxy 204 and the other proxy running on the target peer may communicate directly with each other and may drop almost all messages coming out of their corresponding browsers. The two proxies may communicate via SIP messaging.

Proxy 204 may discard messages based on the information it has about the target peer. For example, when the target peer is located outside of the firewall, proxy 204 may not be able to provide as much efficiency as that described above. When the target peer is located outside of the firewall, proxy 204 may not know how to reach the target peer directly. Accordingly, proxy 204 may send TURN messages to determine how to reach the target peer (e.g., determine what IP address is being broadcast outside of the firewall to that target peer) and set up a relay channel outside of the firewall to reach the target peer. At worst proxy 204 may simply pass along ICE messaging to peers, which may occur if the target peer is outside of the operator firewall. Inefficiencies exist with ICE such that IMS core network capabilities (e.g., peer presence detection) can be leveraged while limiting the browser originated traffic going over the air.

Further, when it is determined that the target peer is not reachable on the cellular network, proxy 204 sends to the target peer a request to communicate using ICE. For example, the target peer may be roaming.

In another example, when WebRTCJavaScriptApp 302 detects that proxy 204 is not installed on mobile device 110, WebRTCJavaScriptApp 302 establishes a WebRTC connection with browser 202 without taking advantage of any proxy to facilitate communications. In such an example, browser 202 may send the particular noted calls and receive the particular noted calls as illustrated in circle 306. WebRTCJavaScriptApp 302 may receive a message from browser 202 that WebRTCJavaScriptApp 302 is unable to set up a connection with an object at, for example, IP address 127.0.0.1, and based on this message WebRTC-JavaScriptApp 302 may determine that proxy 204 is not installed on mobile device 110.

As discussed above and further emphasized here, FIGS. 1-3 are merely examples, which should not unduly limit the scope of the claims.

III. Example Method

Figure 4:
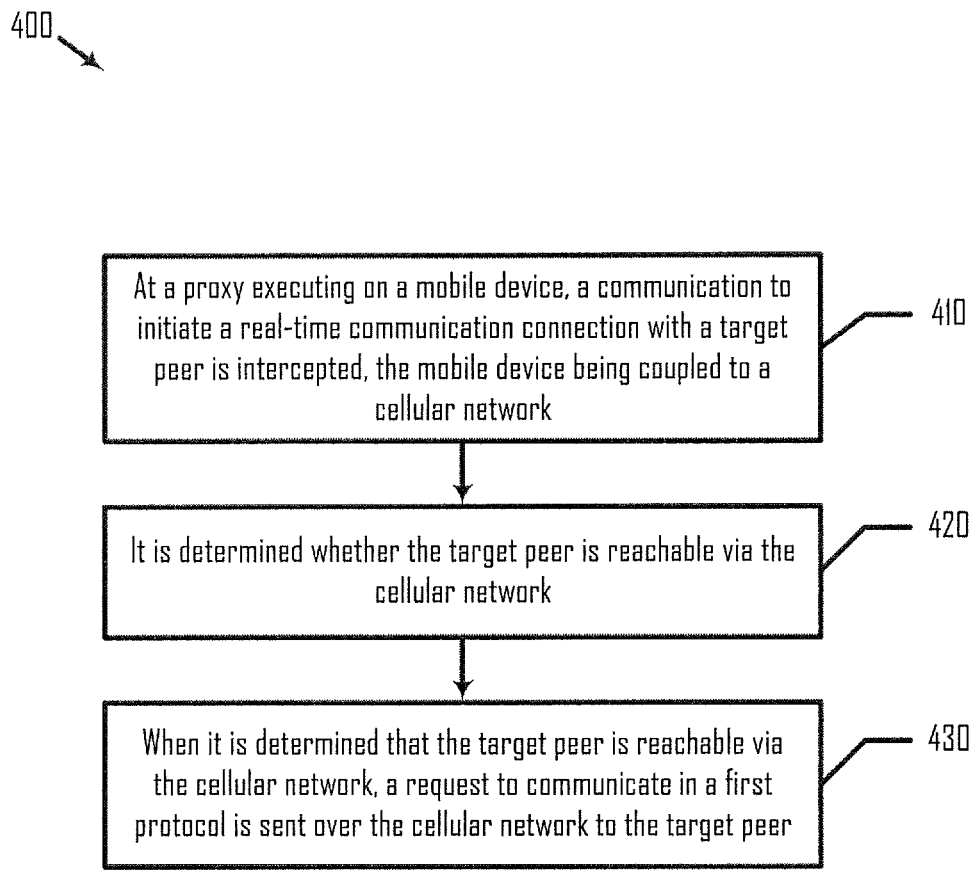
FIG. 4 is a simplified flowchart illustrating a method for facilitating communication between a mobile device positioned within an internal network and a target peer, according to an embodiment.

FIG. 4 is a simplified flowchart illustrating a method 400 for facilitating communication between a mobile device positioned within an internal network and a target peer, according to an embodiment. In an embodiment, the internal network is separated from one or more external networks by network address translation (NAT). Method 400 is not meant to be limiting and may be used in other applications.

Method 400 includes blocks 410-430. In a block 410, at a proxy executing on a mobile device, a communication to initiate a real-time communication connection with a target peer is intercepted, the mobile device being coupled to a cellular network. In an example, proxy 204 is executing on mobile device 110 and intercepts a communication to initiate a real-time communication connection with a target peer, where mobile device 110 is coupled to a cellular network.

In a block 420, it is determined whether the target peer is reachable via the cellular network. In an example, proxy 204 determines whether the target peer is reachable via the cellular network. In a block 430, when it is determined that the target peer is reachable via the cellular network, a request to communicate in a first protocol is sent over the cellular network to the target peer. In an example, when it is determined that the target peer is reachable via the cellular network, proxy 204 sends over the cellular network to the target peer a request to communicate in a first protocol.

Figure 5:
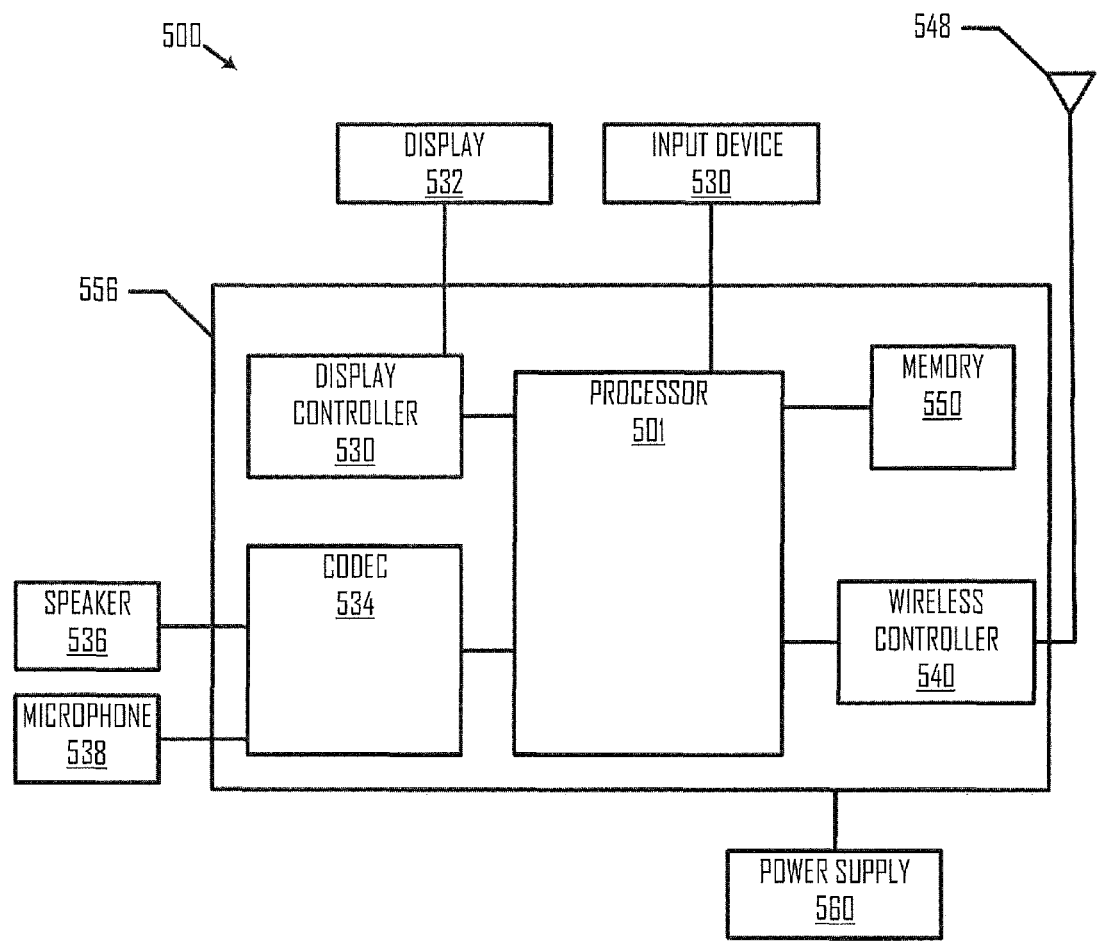
FIG. 5 is a block diagram illustrating a wireless device including a digital signal processor, according to an embodiment.

It is also understood that additional processes may be performed before, during, or after blocks 410-430 discussed above. It is also understood that one or more of the blocks of method 400 described herein may be omitted, combined, or performed in a different sequence as desired IV. Example Wireless Device FIG. 5 is a block diagram illustrating a wireless device 500 including a digital signal processor, according to an embodiment. Wireless device 500 includes a processor, such as a digital signal processor (DSP) 501 to process a plurality of instructions to facilitate communication between wireless device 500 positioned within an internal network and a target peer, where the internal network is separated from one or more external networks by NAT. In an example, DSP 501 processes instructions according to method 400. Mobile device 110 may be implemented as wireless device 500.

FIG. 5 also shows a display controller 530 that is coupled to DSP 501 and to a display 532. A coder/decoder (CODEC) 534 may also be coupled to DSP 501. A speaker 536 and a microphone 538 may be coupled to CODEC 534. Additionally, a wireless controller 540 may be coupled to DSP 501 and to a wireless antenna 548. In an embodiment, DSP 501, display controller 530, memory 550, CODEC 534, and wireless controller 540 are included in a system-in-package or system-on-chip device 556.

In an embodiment, input device 530 and a power supply 560 are coupled to system-on-chip device 556. Moreover, in an embodiment, as illustrated in FIG. 5, display 532, input device 530, speaker 536, microphone 538, wireless antenna 548, and power supply 560 are external to system-on-chip device 556. Each of display 532, input device 530, speaker 536, microphone 538, wireless antenna 548, and power supply 560 may be coupled to a component of system-on-chip device 556, such as an interface or a controller. The user of wireless device may communicate with another user by speaking into microphone 538 or seeing the other user via display 532.

Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC), The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method of facilitating communication between a mobile device positioned within an internal network and a target peer, the internal network being separated from one or more external networks by network address translation (NAT), the method comprising:

intercepting, at a proxy executing on a mobile device, a communication to initiate a real-time communication connection with a target peer, the mobile device being coupled to a cellular network, the communication complying with a first protocol and being sent from a client application executing on the mobile device to the target peer, and the first protocol being a protocol exchange between two target peers to determine whether the target peer of the two target peers is behind a NAT;

registering, at the proxy, with a registry associated with a presence protocol different from the first protocol, an operator of the cellular network providing a presence service to one or more registered proxies, and the presence service associated with the presence protocol;

determining, at the proxy via the presence service, whether the target peer is reachable via the cellular network;

when it is determined that the target peer is reachable via the cellular network, sending over the cellular network to the target peer a request to communicate with the client application in the presence protocol; and when it is determined that the target peer is not reachable on the cellular network, sending a request to the target peer to communicate with the client application in the first protocol.

2. The method of claim 1, wherein the client application is a browser.

3. The method of claim 1, further comprising:
receiving one or more calls in the first protocol from the client application to send to the target peer; and
discarding one or more of the received calls.

4. The method of claim 1, wherein the mobile device is a smartphone, tablet, laptop, or personal digital assistant.

5. The method of claim 1, wherein the first protocol includes discovering one or more paths from the mobile device to the target peer and assigning a priority to the one or more paths relative to each other.

6. The method of claim 5, wherein the first protocol includes sending a communication in accordance with a third protocol to discover a representation of the mobile device's external Internet Protocol (IP) addresses.

7. The method of claim 6, wherein the third protocol is STUN.

8. The method of claim 5, wherein the first protocol includes sending a communication in accordance with a third protocol to establish a permanent connection between the two target peers.

9. The method of claim 8, wherein the third protocol is TURN.

10. The method of claim 1, wherein it is determined that the target peer is reachable via the cellular network, the method further comprising:
determining a rate of keep-alive messages being sent to the target peer; and
modulating the rate of keep-alive messages being sent to the target peer, wherein the modulating includes intercepting keep-alive messages and discarding one or more of the intercepted keep-alive messages.

11. The method of claim 1, wherein the first protocol is Interactive Communication Establishment (ICE).

12. The method of claim 1, further comprising:
receiving a communication requesting whether a proxy resides on the mobile device; and
sending a communication indicating that the proxy resides on the mobile device.

13. The method of claim 1, wherein the proxy is assigned a pre-specified IP address.

14. The method of claim 1, wherein the proxy is assigned an IP address that is reserved for use on the mobile device.

15. The method of claim 1, wherein the cellular network is an LTE network.

16. A system for facilitating communication between a mobile device positioned within an internal network and a target peer, the internal network being separated from one or more external networks by network address translation (NAT), the system comprising:
an intercept module executable on a mobile device, wherein the intercept module intercepts a communication to initiate a real-time communication connection with a target peer, wherein the mobile device is coupled to a cellular network, wherein the communication complies with a first protocol and is sent from a client application executing on the mobile device to the target peer, and the first protocol is a protocol exchange between two target peers to determine whether the target peer of the two target peers is behind a NAT;

a proxy that registers with a registry associated with a presence protocol different from the first protocol, wherein an operator of the cellular network provides a presence service to one or more registered proxies, and the presence service is associated with the presence protocol; and a communication module executable on the mobile device, wherein the communication module determines whether the target peer is reachable via the cellular network, wherein when it is determined that the target peer is reachable via the cellular the communication module network sends over the cellular network to the target peer a request to communicate with the client application in the presence protocol, and wherein when it is determined that the target peer is not reachable on the cellular network, the communication module sends a request to the target peer to communicate with the client application in the first protocol.

17. The system of claim 16, wherein the intercept module receives one or more calls in the first protocol from the client application to send to the target peer and discards one or more of the received calls.

18. The system of claim 16, wherein the mobile device is a smartphone, tablet, laptop, or personal digital assistant.

19. The system of claim 16, wherein the intercept module discovers one or more paths from the mobile device to the target peer and assigns a priority to the one or more paths relative to each other.

20. The system of claim 16, wherein the intercept module sends a communication in accordance with a third protocol to establish a permanent connection between the two target peers.

21. The system of claim 16, wherein when it is determined that the target peer is reachable via the cellular network, the intercept module determines a rate of keep-alive messages being sent to the target peer and modulates the rate of keep-alive messages being sent to the target peer, wherein the intercept module intercepts keep-alive messages and discards, one or more of the intercepted keep-alive messages.

22. A non-transitory computer-readable medium having stored thereon computer-executable instructions for performing operations, comprising:
intercepting, at a proxy executing on a mobile device, a communication to initiate a real-time communication connection with a target peer, the mobile device being coupled to a cellular network, the communication complying with a first protocol and being sent from a client application executing on the mobile device to the target peer, and the first protocol being a protocol exchange between two target peers to determine whether the target peer of the two target peers is behind a NAT;
registering, at the proxy, with a registry associated with a presence protocol different from the first protocol, an operator of the cellular network providing a presence service to one or more registered proxies, and the presence service associated with the presence protocol;
determining, at the proxy via the presence service, whether the target peer is reachable via the cellular network;

when it is determined that the target peer is reachable via the cellular network, sending over the cellular network to the target peer a request to with the client application the presence protocol; and when it is determined that the target peer is not reachable on the cellular network, sending a request to the target peer to communicate with the client application in the first protocol.

23. An apparatus for facilitating communication between a mobile device positioned within an internal network and a target peer, the internal network being separated from one or more external networks by network address translation (NAT), the apparatus comprising:

means for intercepting a communication from an originating peer at a mobile device to initiate a real-time communication connection with a target peer, the mobile device being coupled to a cellular network, the communication complying with a first protocol and being sent from a client application executing on the mobile device to the target peer, and the first protocol being a protocol exchange between two target peers to determine whether the target peer of the two target peers is behind a NAT;

means for determining whether the target peer is reachable via the cellular network;

means for when it is determined that the target peer is reachable via the cellular network, sending over the cellular network to the target peer a request to communicate with the client application in the presence protocol; and means for when it is determined that the target peer is not reachable on the cellular network, sending a request to the target peer to communicate with the client application in the first protocol.

* * * * *